United States Patent
Kueh

(10) Patent No.: US 9,706,402 B2
(45) Date of Patent: Jul. 11, 2017

(54) SYSTEM AND METHOD FOR SECURE DEVICE AUTHENTICATION

(71) Applicant: Neustar, Inc., San Francisco, CA (US)

(72) Inventor: Anthony Y. Kueh, San Francisco, CA (US)

(73) Assignee: Neustar, Inc., San Francisco, CA (US)

(*) Notice: Subject to any disclaimer, the term of this patent is extended or adjusted under 35 U.S.C. 154(b) by 0 days.

(21) Appl. No.: 14/642,680

(22) Filed: Mar. 9, 2015

(65) Prior Publication Data
US 2016/0269898 A1   Sep. 15, 2016

(51) Int. Cl.
| | | |
|---|---|---|
| H04M 1/66 | (2006.01) | |
| H04W 12/06 | (2009.01) | |
| H04L 29/06 | (2006.01) | |
| H04L 29/08 | (2006.01) | |

(52) U.S. Cl.
CPC ............. *H04W 12/06* (2013.01); *H04L 63/08* (2013.01); *H04L 67/02* (2013.01); *H04L 2463/082* (2013.01)

(58) Field of Classification Search
CPC ..... H04W 12/06; H04W 12/08; H04W 12/00; H04W 12/10; H04W 48/16; H04W 4/14; H04W 4/16; H04W 36/0038; H04W 4/00; H04W 80/10; H04L 67/02; H04L 63/08; H04L 2463/082
USPC ...................................... 455/410, 411, 414.1
See application file for complete search history.

(56) References Cited

U.S. PATENT DOCUMENTS

| | | | |
|---|---|---|---|
| 2003/0200156 A1* | 10/2003 | Roseman ............... | G06Q 30/02 705/26.44 |
| 2006/0002556 A1 | 1/2006 | Paul | |
| 2011/0145899 A1* | 6/2011 | Cao ....................... | H04L 9/3213 726/7 |
| 2011/0213956 A1 | 9/2011 | Mukkara et al. | |
| 2011/0247045 A1 | 10/2011 | Rajagopal et al. | |
| 2012/0108203 A1* | 5/2012 | Mechaley, Jr. ......... | H04L 63/18 455/411 |
| 2012/0110640 A1* | 5/2012 | Donelson .............. | H04L 63/102 726/3 |
| 2014/0032759 A1 | 1/2014 | Barton et al. | |
| 2014/0068702 A1 | 3/2014 | Hyndman et al. | |
| 2014/0082715 A1* | 3/2014 | Grajek ................ | H04L 63/0815 726/8 |
| 2014/0359752 A1* | 12/2014 | Swaminathan ....... | H04L 67/025 726/16 |

(Continued)

OTHER PUBLICATIONS

International Search Report and Written Opinion dated Jun. 16, 2016, PCT Application No. PCT/US2016/021612, 12 pages.

*Primary Examiner* — Jean Gelin
(74) *Attorney, Agent, or Firm* — Mahamedi IP Law LLP

(57) ABSTRACT

A method and system for secure authentication of a mobile computing device (MCD) are described. Data that identifies the MCD is obtained. Identification data is exchanged with a network service, which sends embedded data to trigger a secure browser instance on the MCD. A secure single action link specific to the requesting device is then provided, the secure single action link being actionable to communicate to the network service, through the secure browser instance, a session token corresponding to the mobile computing device. The user can perform a selection action on the secure single action link to authenticate the MCD.

19 Claims, 6 Drawing Sheets

(56) References Cited

U.S. PATENT DOCUMENTS

| | | | |
|---|---|---|---|
| 2015/0067807 A1* | 3/2015 | Williams | H04L 63/083 726/7 |
| 2015/0215299 A1* | 7/2015 | Burch | H04L 63/08 726/5 |
| 2015/0237049 A1* | 8/2015 | Grajek | H04L 63/0815 726/7 |
| 2015/0244706 A1* | 8/2015 | Grajek | H04W 12/06 726/6 |
| 2015/0318998 A1* | 11/2015 | Erlikhman | H04L 9/3271 713/171 |
| 2016/0012465 A1* | 1/2016 | Sharp | G06Q 20/18 705/14.17 |
| 2016/0070812 A1* | 3/2016 | Murphy | G06F 17/212 707/608 |

* cited by examiner

SYSTEM AND METHOD FOR SECURE DEVICE AUTHENTICATION

TECHNICAL FIELD

Examples described herein relate to a system and a method for secure device authentication, specifically for establishing a secure link between customer mobile communication devices and mobile applications requesting the authentication through a network service.

BACKGROUND

Mobile applications have been providing better security for account users in recent times. Today, many mobile applications ensure quick and easy-to-use account creation or first-time login by using a SMS pin-based authentication. To create an account for a particular application or log in for the first time from a particular device, the user can type in their phone number and get a SMS text message with a one-time numerical pin through their phone's service provider. To authenticate the account on the mobile device, the user then enters this numerical pin for verification, thus eliminating the need to enter any passwords. Such authentication assumes that the user that receives the numerical pin in a SMS text message is also in possession of the phone which originates the authentication request.

DETAILED DESCRIPTION

Figure 1:
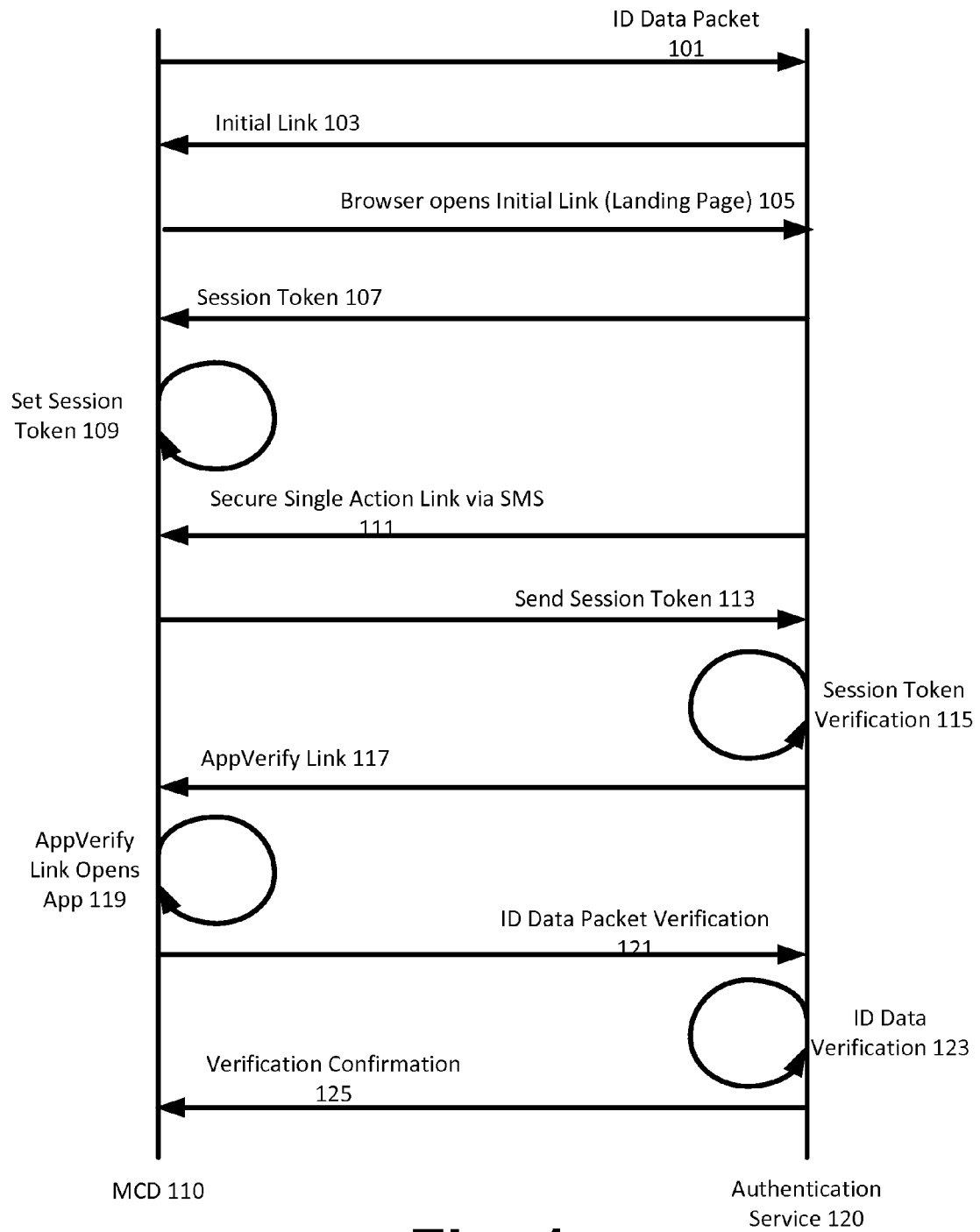
FIG. 1 is a sequence diagram that illustrates an example method for secure device authentication, representing the communication between the mobile device and the authentication service, in accordance with some aspects.

Embodiments described herein implement secure authentication for mobile computing devices (MCD). According to some embodiments, a server authenticates an MCD by causing an instance of a secure browser to be initiated on the device, and further by initiating a process to provide the MCD with a single action link that can be acted on by the user only through the secure browser instance.

In some examples, a single-action link can be communicated to the MCD using a Short Message Service (SMS) protocol. Other communication mediums can be used to communicate a single action link, but SMS programs provide an example of a program that inherently limits the ability of the user to perform link actions other than the action of opening the link.

As used herein, a single action link refers to a link that is structured or otherwise communicated to an MCD in a manner that precludes any action from the user other than the action of link selection. The single action link can include a session token corresponding, or specific to the mobile computing device. A link can be considered to be a single action link by virtue of the link being communicated through SMS to an MCD that is under authentication. Thus, when an example recites use of a single action link, it is assumed that the user cannot, for example, copy and paste the link, or open the link using a program other than the default browser using a secure connection.

The limitations imposed on the user's ability to act on the link can originate from the operating system of the MCD. In variations, however, application programming can be used to implement some or all of the operations described with some examples. For example, an authentication program can be structured to open a secure browser instance, and to receive links that can only be opened from a particular application or application resource.

In particular, embodiments described herein recognize and resolve problems in the conventional approaches to mufti-factor authentication processes. Specifically, embodiments recognize that conventional approaches to mufti-factor authentication assume that the device being authenticated is rightfully possessed by an individual who has knowledge of a pin number. However, among other potential weaknesses, conventional approaches communicate the necessary pins through communication channels that can be compromised. Additionally, many conventional approaches which use SMS text message as part of the multi-factor authentication have little protection from the text message being intercepted and/or forwarded to a different device, thereby allowing another person to use the pin. Furthermore, the pins communicated from conventional authentication services can be compromised simply by being seen by an unauthorized person, when the receiving mobile device displays text messages even in a locked mode. These and other shortcomings mean that even limited access by a bad actor (e.g., visual access) to a private mobile computing device can result in a mufti-tier authentication process that is compromised.

In contrast to conventional approaches, embodiments as described provide a mufti-tier authentication that addresses many of the flaws in conventional approaches. Among other benefits, embodiments as described enable a mufti-factor authentication process in which a mobile communication device can be authenticated in a fully trusted and sequenced environment. Furthermore, embodiments described herein eliminate duplication that is otherwise present in a conventional pin-based authentication process. Additionally, embodiments ensure that the action taken on the account credentials is on the same device that originated the request for authentication.

In an example, identification data for an MCD is obtained by a network service. In turn, the network service sends data that triggers a secure browser instance on the MCD. A secure single action link is then provided to authenticate the MCD.

In some aspects, an embodiment provides for programmatic actions of verifying data that was provided to the MCD with the network service, after the user selects the secure single action link.

Still further, a secure single action link can be provided to an MCD as part of a mufti-tier authentication process, the secure single action link being actionable to communicate to the network service, through the secure browser instance, a session token corresponding to the mobile computing device. When the link is selected and verified, the secure browser instance on the MCD is redirected to a resource that verifies the identification data with the network service.

According to some examples, the data identifying the MCD can be the phone number tied to the MCD and a unique identifier. The unique identifier can be the Device ID of the MCD (for example, the IDFA (Identifier For Advertising) in iOS devices or the AdID in Android devices).

In other examples, the identification data can also include the global positioning satellite (GPS) coordinates of the MCD or the Internet Protocol (IP) address used by the MCD.

In one example, the data sent to the MCD includes an initial link that automatically triggers the browser instance to open a landing page on the network service and receive a session token from the network service. In such an example, the data verified by the network service can involve verifying session tokens provided to the MCD. The session tokens verified can be the same or different tokens, in accordance with some aspects.

The term "session token" and variants thereof refer to data that is embedded in the links or that are provided to the MCD by the network service. In some examples, they can be in the form of cookies for the browser application.

The term "secure single action link" and variants thereof refer to a custom link that is specific to the MCD that requests the authentication. The custom link can also include an embedded session token that is the same or different than the session token already provided to the MCD to trigger a secure browser instance. In some aspects, the secure single action link is provided to the MCD through a SMS text message using the MCD's service provider.

Among other benefits, examples as described eliminate the possibility of duplication or hijacking of the security instrument, for example, a numerical pin, by providing a trusted and sequenced environment for authentication. In doing so, the system and method presented ensures that the action taken for authentication of the MCD is on the same device that originated the request for authentication.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions.

Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

FIG. 1 is a sequence diagram that illustrates an example method for secure device authentication, representing the communication between MCD 110 and authentication service 120, in accordance with some aspects. By way of example, MCD 110 can correspond to a smartphone or feature phone, capable of cellular messaging (e.g., Short Message Service or SMS, Multimedia Message Service or MMS, email, etc.), data transmissions (e.g., run applications, web browsing), and telephony. The MCD 110 can include an operating system such as IOS (manufactured by APPLE INC.) or ANDROID (manufactured by GOOGLE INC.). The particular form factor of MCD 110 can also vary. For example, the MCD 110 can alternatively be in the form of a tablet or tablet hybrid ("phablet"), wearable electronic device (e.g., watch or eyeglass), or laptop (e.g., convertible, utltramobile, etc.).

With reference to FIG. 1, MCD 110 sends a data packet identifying the device and the application requesting the authentication at step 101. Upon receipt of the ID data packet, the authentication service can send an initial link (step 103) back to the MCD 110 which automatically opens a landing page on the network service in a browser instance (step 105) on the MCD 110. Next, at step 107, authentication service 120 sends a session token to the MCD, and at step 109 the MCD assigns the session token to the browser instance (for e.g. in the form of a browser cookie) to establish a secure connection. Additionally, the authentication service 120 can send to the MCD a Secure Single Action Link through a SMS text message at step 111. When the user selects the Secure Single Action Link, it can open in the secure browser instance on the MCD, and the MCD sends the session tokens to authentication service 120 for verification at step 113. Upon verification of the session tokens in step 115, authentication service 120 can send an appverify link, a link with embedded ID data that was initially received (Step 117). The appverify link can automatically open the requesting application and pass into the application the embedded ID data packet data (step 119). This ID data can then be sent back to the authentication service 120 for verification (step 121). The authentication service 120 performs final verification of the ID data in step 123 and sends a verification confirmation back to the MCD (step 125).

Methodology

Figure 2:
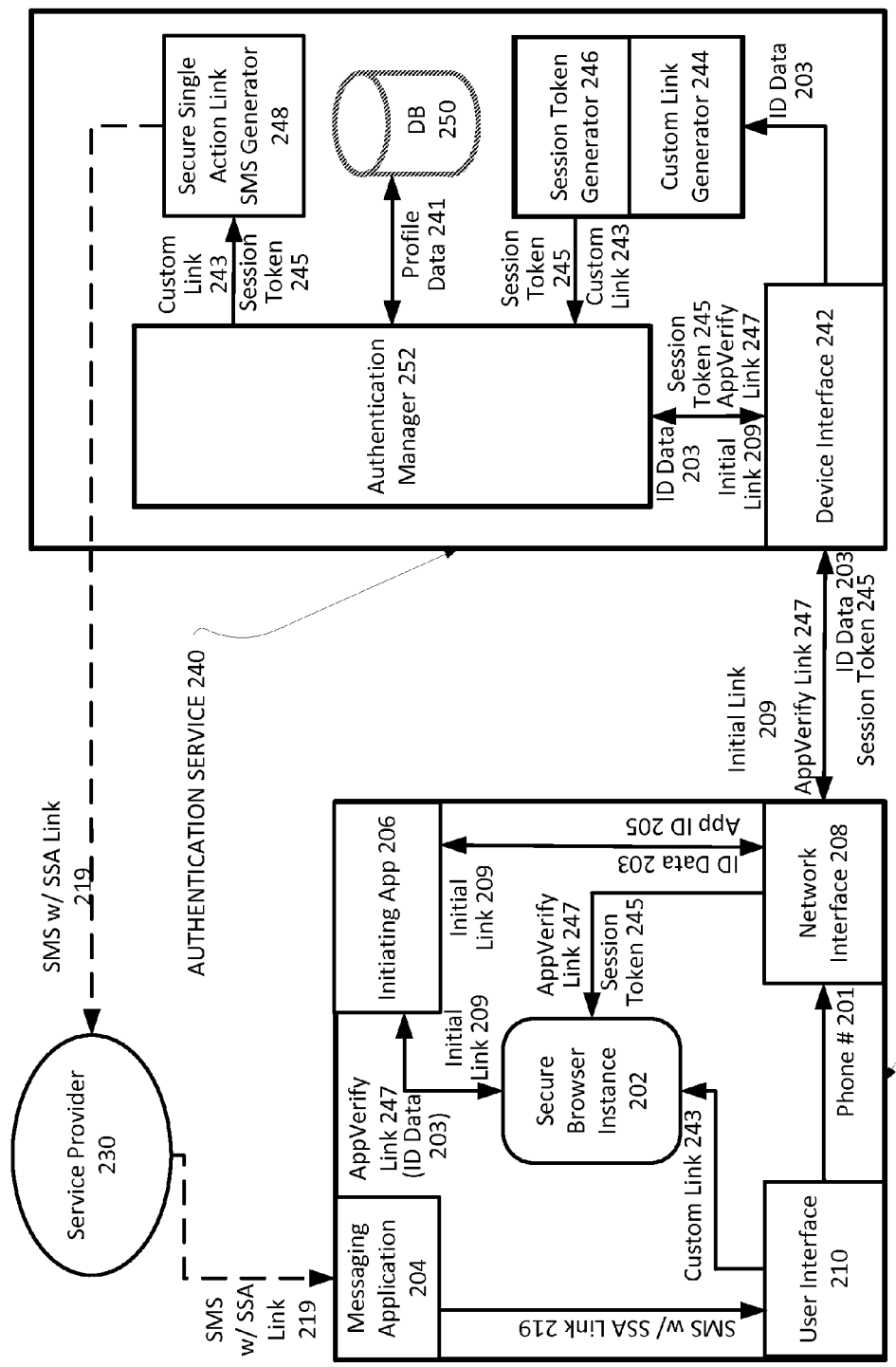
FIG. 2 is a block diagram that illustrates an example system for secure device authentication, showing components and data flow, in accordance with some aspects.

FIG. 2 illustrates a system for utilizing a browser instance and a secure and structured link exchange to enable authentication of a mobile computing device, according to an embodiment. In one implementation, a system 200 includes an MCD 220 and an authentication server 240. The MCD 220 includes a messaging application 204, an initiating application 206, a network interface 208, and a user interface 210. The authentication service 240 includes a device interface 242, a custom link generator 244, a session token generator 246, and a secure single action link SMS generator 248.

On the MCD 220, the initiating application 206 executes to initiate an authentication or secure authentication process such as described with an example of FIG. 1. The initiating application 206 can trigger communication, via network interface 208, of a unique identifier, such as one or more of a device phone number 201, application identifier, serial number, etc. (collectively "ID data 203"). The collected ID data 203 is sent to authentication service 240, which implements a mufti-tier authentication process.

On the authentication service 240, the device interface 242 receives the ID data 203. The ID data 203 is used to generate a custom link 243 (generated by custom link generator 244) and a session token 245 (generated by session token generator 246). The authentication manager 252 generates from the ID data 203 an initial link 209 for the MCD 220, which is provided as a response to the MCD 220. The initial link 209 is sent to the initiating app 206, which launches a secure browser instance 202 to open the initial link 209 to a landing page on the authentication service 240. When initial link 209 is opened, it triggers the authentication service 240 to send the session token 245 and set the session token 245 as a cookie into the secure browser instance 202. The initial link 209 and the session token 245 can be communicated to the MCD 220 via the device interface 242 and the network interface 208.

At the same time, the custom link generator 244 generates the custom link 243 to be specific to MCD 220 and to the initiating application 206.

On the MCD 220, the generation of the secure browser instance 202 provides a first tier of a mufti-tier authentication process. The custom link 243 and session token 245 can be forwarded to a messaging process (termed Secure Single Action (SSA) Link SMS Generator 248), from which a secure single action link 219 is generated. The SSA Link SMS Generator 248 packages session token 245 embedded in Custom Link 243 in a SMS text message 219. The SSA text message 219 is communicated by way of independent transport through the wireless service provider 230 to the MCD 220.

On the MCD 220, the messaging application (e.g., SMS application) receives and renders a message with the SSA link 219. The user can view and select the SSA link 219 from within the messaging application 204. Upon selection of the SSA link 219, the custom link 243 is opened in the secure browser instance 202 to trigger verification. The session token sent initially after the initial link 209 and the session token embedded in the custom link 243, are then verified by the authentication service 240.

Once the session tokens 245 are verified, the authentication manager 252 provides an appverify link 247 to the MCD 220. The appverify link 247 is embedded with ID data 203 and may redirect the secure browser instance 202 to re-launch initiating app 206. When the initiating application 206 is re-launched, the embedded ID data 203 is passed into the application. The initiating application 206 then sends the ID data 203 back to the authentication service 240 for final verification.

The authentication manager 252 can operate to save ID data 203, as well as all the links generated, and the session token 245 which is associated with the particular authentication session. Collectively, this data is represented as profile data 241. The profile data 241 can be stored in a profile database 250 so that it can query such data when needed for verification.

Figure 3:
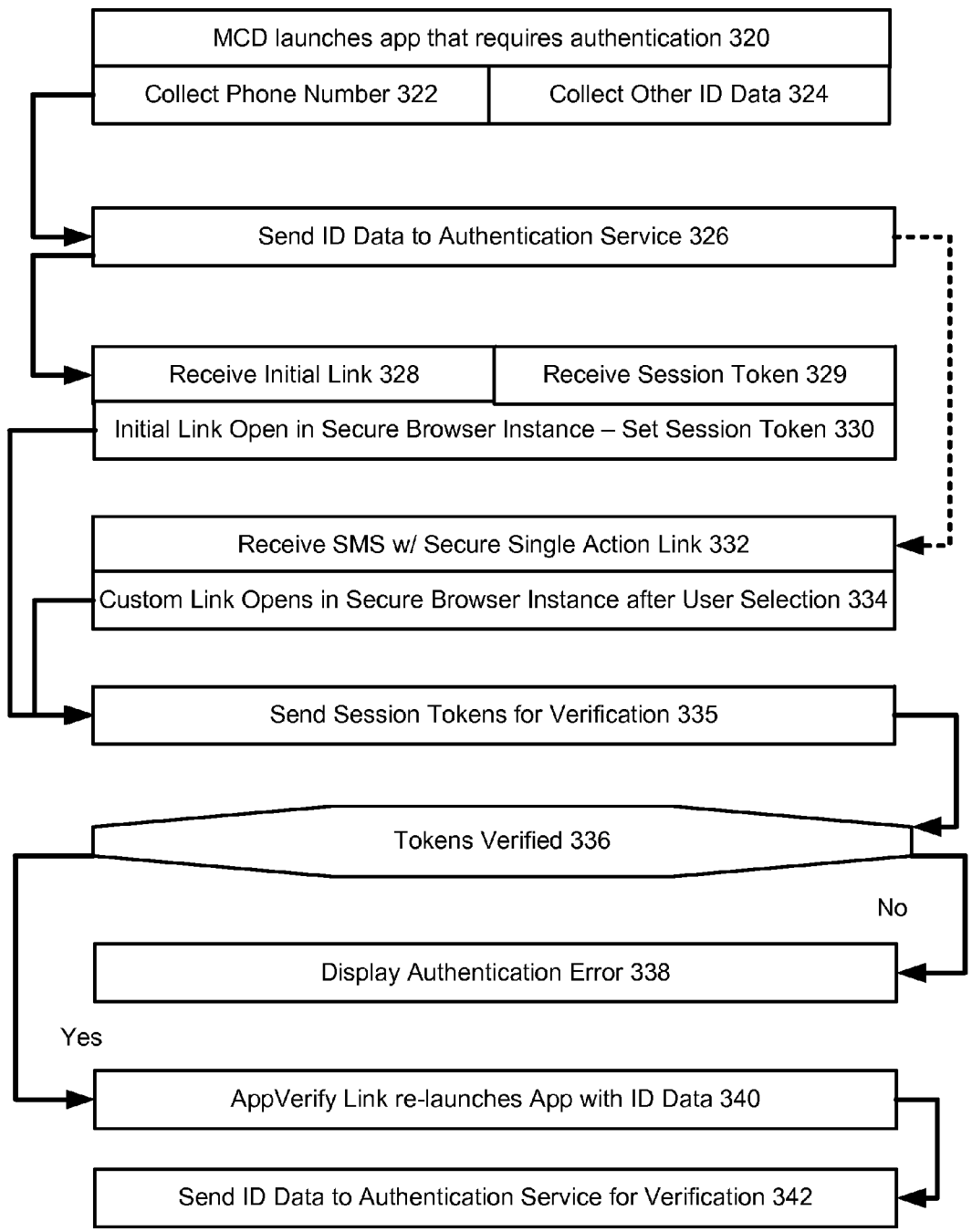
FIG. 3 is a flow diagram that illustrates an example method for secure device authentication being implemented on the mobile communication device, in accordance with some aspects.
Figure 4:
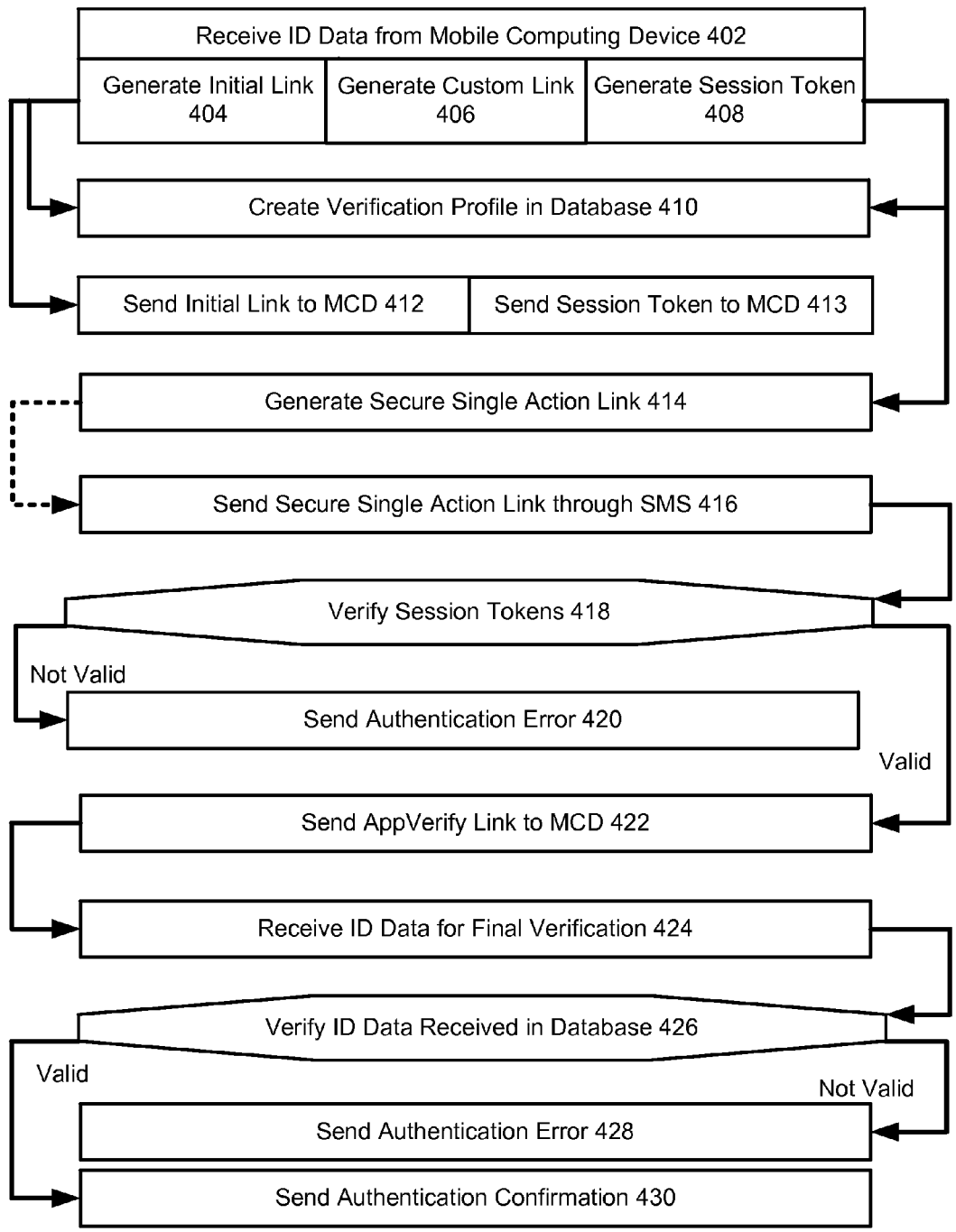
FIG. 4 is a flow diagram that illustrates an example method for secure device authentication being implemented by the authentication service, in accordance with some aspects.

FIG. 3 illustrates a method for utilizing a browser instance and a secure and structured link exchange to enable authentication of a mobile computing device. FIG. 4 illustrates a method for operating an authentication service to provide a secure and structured single-action link to an MCD for purpose of implementing a mufti-tier authentication, according to an embodiment. Examples of FIG. 3 and FIG. 4 can be implemented using components such as described with an example of FIG. 2. Accordingly, in describing examples of FIG. 3 and FIG. 4, reference may be made to elements of FIG. 2 for purpose of illustrating a suitable component for performing a step or sub-step being described.

With reference to FIG. 3, the MCD 220 launches an application that requires authentication (e.g., initiating application 206) (320). Once the authentication is launched (320), a phone number or other identification data of the MCD 220 (322) is collected (324). While many examples described data affixed to the device (e.g., the MCD's phone number, hardware or product identifier), variations provide for the use of alternative identification data such as, for example, the MCD's GPS coordinates and/or the IP address of the device. The collected ID data is sent to the authentication service 240 (326).

In response to sending the collected ID data, the MCD 220 receives one or more links from the authentication service 240. As described with an example of FIG. 2, an initial link can be received (328) along with a session token (329), which triggers the MCD to open a secure browser instance (330). A follow-on link can correspond to a secure single action link 219. The SSA link 219 can be received as part of an SMS text message, transmitted to the MCD 220 through the wireless service provider of the MCD (332).

After the user selects the link in the SMS message, a custom link with an embedded session token is opened in the secure browser instance (334). The two session tokens are then sent to the authentication service for verification (335). Based on the verification result (336), the MCD displays an authentication error if the verification fails (338). If the verification of the session tokens is successful, MCD 220 automatically receives an appverify link 247, which opens in the secure browser instance and re-launches the mobile application that initiated the authentication (340). The ID data embedded in the appverify link 247 is passed into the mobile application, and also sent back to the authentication service 240 for final verification (342).

With reference to an example of FIG. 4, the authentication service 240 can be triggered by receipt of ID data 203 from a MCD requesting authentication (402). The authentication service 240 generates an initial link (404), a custom link (406) and a session token (408), each of which are associated with the requesting MCD and the mobile application. The generated links and the session token along, with the ID data 203, are saved in a profile in the database for future queries (410). The authentication service then sends the initial link to the MCD 220 (412). Once the initial link opens the landing page on the authentication service, it triggers the authentication service to send the session token to the MCD (413). The authentication service 240 further generates an SMS text message with a secure single action link (414). This message is sent through the wireless carrier of the MCD 220 via an SMS text message transport (416). Once the user selects the custom link, the authentication service 240 verifies the session token initially sent to the MCD 220 and the session token embedded in the custom link (418). If the verification fails, the authentication service sends an authentication error to the MCD (420). If the session tokens are verified, the authentication service 240 sends an appverify link 247 to the MCD 220 (422). The appverify link 247 triggers a re-launch of the initiating application 206, which results in communication of the ID data 203 back to authentication service 240 for final verification (424). The authentication service verifies the ID data 203 in its profile in the database (426) and sends an authentication error message if the verification process described fails (428). The authentication service sends an authentication confirmation to the MCD if the verification is successful (430).

While operations of the system are described above as being performed by specific components, modules or systems of MCD 220 and Authentication Service 240, it will be appreciated that these operations need not necessarily be performed by the specific components identified, and could be performed by a variety of components and modules, potentially distributed over a number of machines. As used herein, a secure browser instance may refer to secure browser windows, secure browser sessions or a browser application with a secure connection. Accordingly, references may be made to elements of FIG. 3 or FIG. 4 for the purpose of illustrating suitable components or elements for performing a step or sub step being described. Alternatively, at least certain ones of the variety of components and modules described in FIG. 2 can be arranged within a single hardware, software, or firmware component. It will also be appreciated that some of the steps of this method may be performed in parallel or in a different order than illustrated.

Computer System

Figure 5:
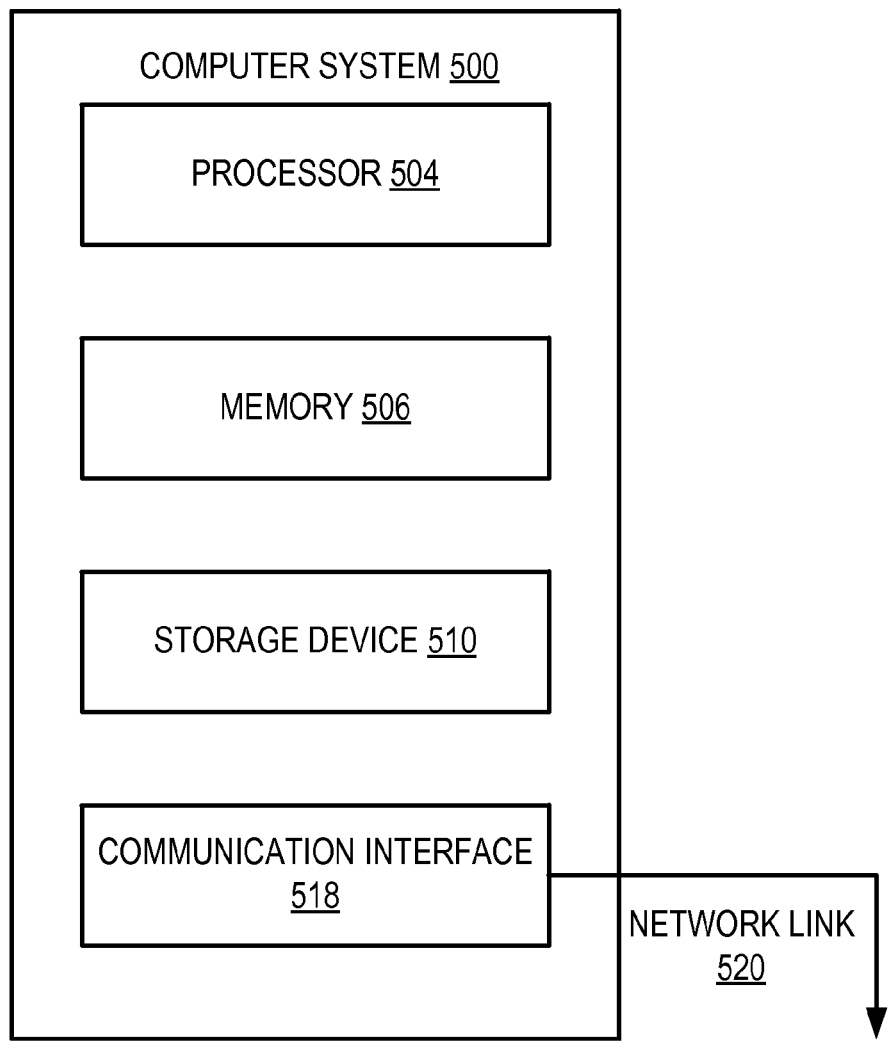
FIG. 5 is a block diagram that illustrates a computing system upon which aspects described herein may be implemented.

FIG. 5 is a block diagram that illustrates a computer system upon which aspects described herein may be implemented. For example, authentications service such as described with an example of FIG. 2 may be implemented using one or more servers such as described by FIG. 5.

In an embodiment, computer system 500 includes processor 504, memory 506 (including non-transitory memory), storage device 510, and communication interface 518. The memory 506 can store instructions 505 for implementing a multi-tier authentication process, such as described with an example method of FIG. 4. Computer system 500 includes at least one processor 504 for executing the mufti-tier authentication instructions 505. The main memory 506 can include a random access memory (RAM) or other dynamic storage device, for storing information and instructions to be executed by processor 504. The memory 506 may also store temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., Wi-Fi and WiMax networks).

Figure 6:
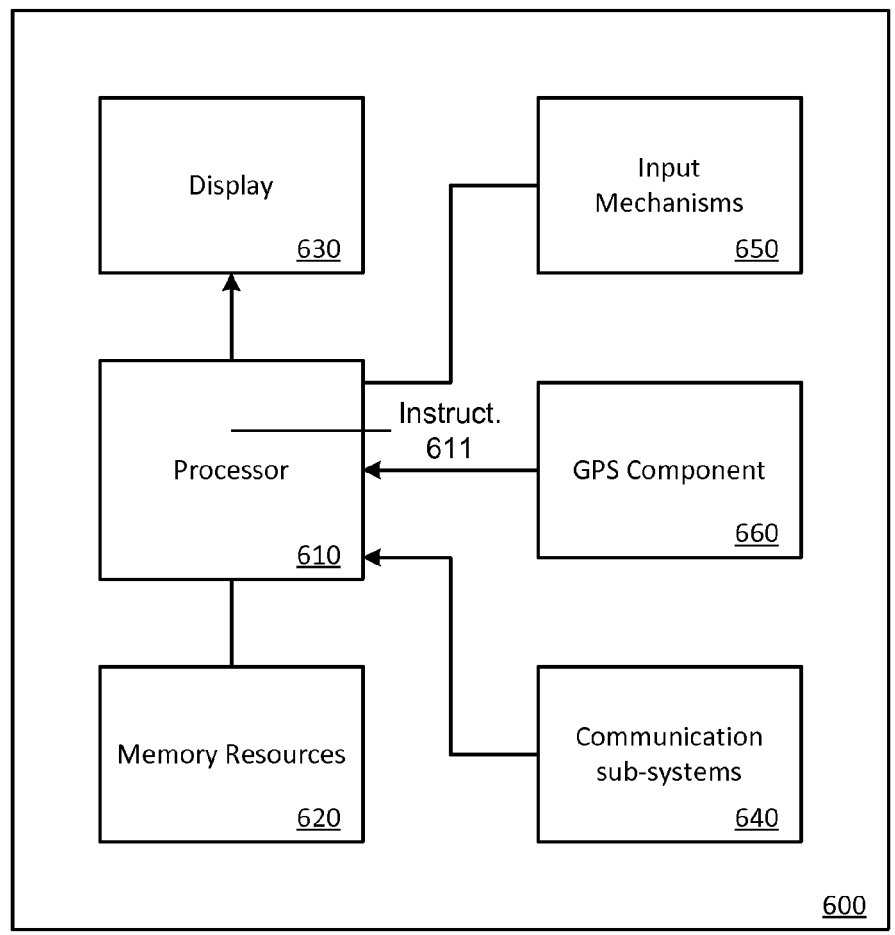
FIG. 6 is a block diagram that illustrates a mobile computing device upon which aspects described herein may be implemented.

Examples described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software FIG. 6 is a block diagram that illustrates a mobile computing device upon which embodiments described herein may be implemented. In one embodiment, a mobile computing device 600 can correspond to, for example, a cellular device that is capable of telephony, messaging, and data services. Examples of such devices include smartphones, handsets or tablet devices for cellular carriers. Computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and a GPS component 660. In one example, at least one of the communication sub-systems 640 sends and receives cellular data over data channels and voice channels.

The processor 610 can configured with software and/or other logic to perform one or more processes, steps and other functions described with implementations, such as described by an example of FIG. 3. In one implementation, the 610 is configured, with instructions 611 and data stored in the memory resources 620, to, for example, implement the mufti-tier authentication process by opening a secure browser instance and enabling concurrent selection of the SSA from a rendered text message. A communication sub-systems 640 can enable the computing device 600 to communicate with other servers and computing devices, for example, over a network (e.g., wirelessly or using a wireline). In some variations, a GPS component 660 can obtain position information that can be used to identify the device for purpose of authentication.

The system and method described in the various embodiments can be used as a part of a secure onboarding process of a mobile computing device. Secure onboarding of a device can include linking of customer data to targeted applications. Secure onboarding can also include assigning certain privileges to certain devices, which would require proper identification and authentication of the mobile device that is onboarded. In organizations, secure onboarding of mobile devices can be used to add the identity of devices used by new employees, so that the devices are automatically authenticated to access content that may not be available to non-employees.

The system and method described in the various embodiments can also be used by various application developers to limit access to protected content to the devices used by their subscribers. These devices can be authenticated to make sure that the content is not shared and accessed by other devices that have not paid for the subscription. For example, a publisher can use the authentication method to limit sharing of accounts for paid content, so that only one device can access the paid content. Likewise, the system and method described above can be used in any process that requires multi-factor authentication.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A method for authenticating a mobile computing device, the method comprising:
   obtaining data that identifies the mobile computing device;
   exchanging the data with a network service to trigger a secure browser instance on the mobile computing device; and
   providing a secure single action link to the mobile computing device, the secure single action link provided in a manner that precludes, other than a link selection action, at least one of a copy and a paste user input actions, the secure single action link further having an embedded session token, whereupon performance of the link selection action by the user within the secure browser instance, the session token corresponding to the mobile computing device is communicated to the network service.

2. The method of claim 1, further comprising:
   verifying the exchanged data with the network service after the user performs the link selection action on the secure single action link.

3. The method of claim 2, further comprising:
   redirecting the secure browser instance to an appverify link; and
   verifying the data that identifies the mobile computing device with the network service.

4. The method of claim 2, wherein verifying the exchanged data with the network service comprises verifying the session token.

5. The method of claim 2, wherein verifying the exchanged data with the network service comprises verifying the session token with a different session token corresponding to the mobile computing device.

6. The method of claim 1, wherein the data that identifies the mobile computing device includes a phone number for the mobile computing device.

7. The method of claim 1, wherein the data that identifies the mobile computing device includes a unique identifier for the mobile computing device.

8. The method of claim 1, wherein the data that identifies the mobile computing device includes a set of global positioning satellite coordinates for the mobile computing device.

9. The method of claim 1, wherein the data that identifies the mobile computing device includes an internet protocol address for the mobile computing device.

10. The method of claim 1, wherein exchanging the data with the network service to trigger the secure browser instance comprises sending the data that identifies the mobile computing device to the network service.

11. The method of claim 10, wherein exchanging the data with the network service to trigger the secure browser instance further comprises receiving the session token from the network service.

12. The method of claim 11, wherein exchanging the data with the network service to trigger the secure browser instance further comprises automatically opening a browser session and assigning the session token to the browser session.

13. The method of claim 1, wherein providing the secure single action link to the mobile computing device comprises providing the secure single action link in a text message.

14. The method of claim 1, the method being implemented as part of a secure onboarding of the mobile computing device.

15. An authentication system for a mobile computing device comprising:
   a memory resource to store instructions;
   one or more processors using the instructions stored in the memory resource to:
   obtain data that identifies the mobile computing device;
   exchange the data with a network service to trigger a secure browser instance on the mobile computing device;
   providing a secure single action link to the mobile computing device, the secure single action link provided in a manner that precludes, other than a link selection action, at least one of a copy and a paste user input actions, the secure single action link further having an embedded session token, whereupon performance of the link selection action by the user within the secure browser instance, the session token corresponding to the mobile computing device is communicated to the network service;
   verify the exchanged data with the network service after the user performs a selection action on the secure single action link;
   redirect the secure browser instance to an appverify link; and
   verify the data that identifies the mobile computing device with the network service.

16. A non-transitory computer-readable medium for authenticating a mobile computing device, the computer-readable medium storing instructions that, when executed by one or more processors, cause a computing device of the one or more processors to perform operations that include:
   obtaining data that identifies the mobile computing device;
   exchanging the data with a network service to trigger a secure browser instance on the mobile computing device; and
   providing a secure single action link to the mobile computing device, the secure single action link provided in a manner that precludes, other than a link selection action, at least one of a copy and a paste user input actions, the secure single action link further having an embedded session token, whereupon performance of the link selection action by the user within the secure browser instance, the session token corresponding to the mobile computing device is communicated to the network service.

17. The non-transitory computer readable medium of claim 16, further comprising instruction that, when executed by the one or more processors, cause the computing device to:
   verifying the exchanged data with the network service after the user performs the link selection action on the secure single action link.

18. The non-transitory computer readable medium of claim 17, further comprising instruction that, when executed by the one or more processors, cause the computing device to:
   redirect the secure browser instance to an appverify link; and
   verify the data that identifies the mobile computing device with the network service.

19. The non-transitory computer readable medium of claim 17, wherein the data that identifies the mobile computing device includes a phone number for the mobile computing device.

* * * * *